US012723561B2

(12) United States Patent
Iwamoto

(10) Patent No.: US 12,723,561 B2
(45) Date of Patent: Sep. 1, 2026

(54) EVAPORATED FUEL TREATMENT DEVICE

(71) Applicant: Futaba Industrial Co., Ltd., Okazaki (JP)

(72) Inventor: Koji Iwamoto, Okazaki (JP)

(73) Assignee: Futaba Industrial Co., Ltd., Okazaki (JP)

(*) Notice: Subject to any disclaimer, the term of this patent is extended or adjusted under 35 U.S.C. 154(b) by 340 days.

(21) Appl. No.: 18/396,870

(22) Filed: Dec. 27, 2023

(65) Prior Publication Data

US 2024/0240600 A1 Jul. 18, 2024

(30) Foreign Application Priority Data

Jan. 12, 2023 (JP) ................................ 2023-003102

(51) Int. Cl.
*B01D 53/02* (2006.01)
*B01D 53/04* (2006.01)
*F02M 25/08* (2006.01)

(52) U.S. Cl.
CPC ..... *F02M 25/0854* (2013.01); *B01D 53/0407* (2013.01); *B01D 2253/102* (2013.01); *B01D 2259/4516* (2013.01); *F02M 25/0836* (2013.01)

(58) Field of Classification Search
CPC ...... B01D 2253/102; B01D 2259/4516; B01D 53/0407; B01D 53/0415; F02M 25/08; F02M 25/0836; F02M 25/0854
See application file for complete search history.

(56) References Cited

U.S. PATENT DOCUMENTS

2003/0089345 A1* 5/2003 Itou .................... F02M 25/0836 123/520
2006/0011173 A1* 1/2006 Davis .............. B60K 15/03177 220/749
2016/0245238 A1* 8/2016 Ueda .................. F02M 25/0854
2021/0016219 A1* 1/2021 Kosugi ............. B01D 53/0407
2022/0252025 A1 8/2022 Nakagawa et al.

FOREIGN PATENT DOCUMENTS

JP S5677642 U 6/1981
JP H0459357 U 5/1992
JP 2021017839 A 2/2021
JP 2022120492 A 8/2022

OTHER PUBLICATIONS

Notice of Reasons for Refusal in Japanese Patent Application No. 2023-003102, mailed Nov. 19, 2024, 6 pages.
Notice of Reasons for Refusal in Japanese Patent Application No. 2023-003103, mailed Nov. 19, 2024, 6 pages.
Decision of Refusal for Japanese Patent Application No. 2023-003102 mailed Mar. 11, 2025 (6 pages including English translation).

* cited by examiner

*Primary Examiner* — Christopher P Jones
(74) *Attorney, Agent, or Firm* — Withrow + Terranova, PLLC; Vincent K. Gustafson

(57) ABSTRACT

Provided is an evaporated fuel treatment device. The evaporated fuel treatment device includes a main body case and a lid. The main body case includes two or more adsorption chambers, an adsorber, and an opening. The lid is configured to (i) close at least a part of the opening and (ii) be fixed to the main body case with a snap-fit structure. The lid is configured to be arranged in the vicinity of the adsorber.

7 Claims, 9 Drawing Sheets

EVAPORATED FUEL TREATMENT DEVICE

CROSS-REFERENCE TO RELATED APPLICATIONS

This application claims the benefit of Japanese Patent Application No. 2023-003102 filed on Jan. 12, 2023 with the Japan Patent Office, the entire disclosure of which is incorporated herein by reference.

BACKGROUND

The present disclosure relates to an evaporated fuel treatment device.

For example, Japanese Unexamined Patent Application Publication No. 2022-120492 discloses a configuration of an evaporated fuel treatment device whose opening in a main body case and a lid configured to close the opening are fixed by welding.

SUMMARY

In the above Publication, there may be a case where the opening and the lid are fixed by vibration welding. The vibration welding is a method including applying vibrations to a joining part between the opening and the lid, and using a resulting friction so as to melt the opening and a part of the lid to thereby weld these together.

The inventors of the subject application have carefully studied the above technique and found a problem that the configuration of welding the opening and the lid using vibrations is likely to damage an adsorber arranged in the vicinity of the opening due to the vibrations.

It is desirable that one aspect of the present disclosure suppresses, in an evaporated fuel treatment device whose opening in a main body case and a lid are fixed together, a damage of an adsorber to be arranged in the vicinity of the opening.

One aspect of the present disclosure provides an evaporated fuel treatment device. The evaporated fuel treatment device comprises a main body case and a lid. The main body case includes two or more adsorption chambers, an adsorber, and an opening.

Each adsorption chamber of the two or more adsorption chambers accommodates adsorbents therein. The two or more adsorption chambers include an atmosphere-side adsorption chamber communicating with the atmosphere. The adsorber is an aggregate of the adsorbents. The adsorber is arranged at least in the atmosphere-side adsorption chamber.

The opening allows the atmosphere-side adsorption chamber to communicate with the atmosphere. The lid is configured to (i) close at least a part of the opening and (ii) be fixed to the main body case with a snap-fit structure. The lid is configured to be arranged in the vicinity of the adsorber.

In the above configuration, where the lid and the adsorber are arranged in the vicinity of each other, the snap-fit structure is utilized in fixing the lid and the main body case to each other. Thus, even when the fixation causes vibrations, the vibrations are not easily transferred to the adsorber as compared to a case where vibration welding is utilized. Therefore, this configuration can suppress a damage of the adsorber.

In one aspect of the present disclosure, the adsorber may be configured such that an outer peripheral part thereof contacts the main body case. Such a configuration allows a wider cross-sectional area with respect to a flow path since the outer peripheral part of the adsorber contacts the main body case.

In one aspect of the present disclosure, the main body case may further include a retaining portion, a large-diameter portion, and a stepped portion. The retaining portion retains the adsorber. The large-diameter portion is configured to (i) be arranged so as to surround the lid at a position away from and radially outward of the retaining portion and (ii) be coupled to the lid with the snap-fit structure. The stepped portion forms a step coupling the retaining portion and the large-diameter portion.

In the above configuration, even in a case where impact occurs when the main body case and the lid are coupled with the snap-fit structure, the impact can be absorbed by the stepped portion. Therefore, this configuration can inhibit the impact from being transferred to the retaining portion and the adsorber.

In one aspect of the present disclosure, the evaporated fuel treatment device may further comprise a sealing member configured to seal a space between the opening and the lid over an entire circumference of the space.

Such a configuration easily allows airtightness at the opening without performing welding or the like since the sealing member seals the space between the opening and the lid.

In one aspect of the present disclosure, the atmosphere-side adsorption chamber may be an auxiliary chamber formed to have a smaller volume with respect to a main chamber. The auxiliary chamber is an adsorption chamber included in the two or more adsorption chambers and communicating with the atmosphere-side adsorption chamber. Furthermore, the adsorber may be formed such that a cross-sectional area thereof with respect to a gas flow in the auxiliary chamber is greater than a cross-sectional area of the adsorber with respect to a gas flow in the main chamber.

The above configuration can reduce ventilation resistance of an evaporated fuel flowing through the atmosphere-side adsorption chamber.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENT

1. Embodiment

1-1. Configuration

Figure 1:
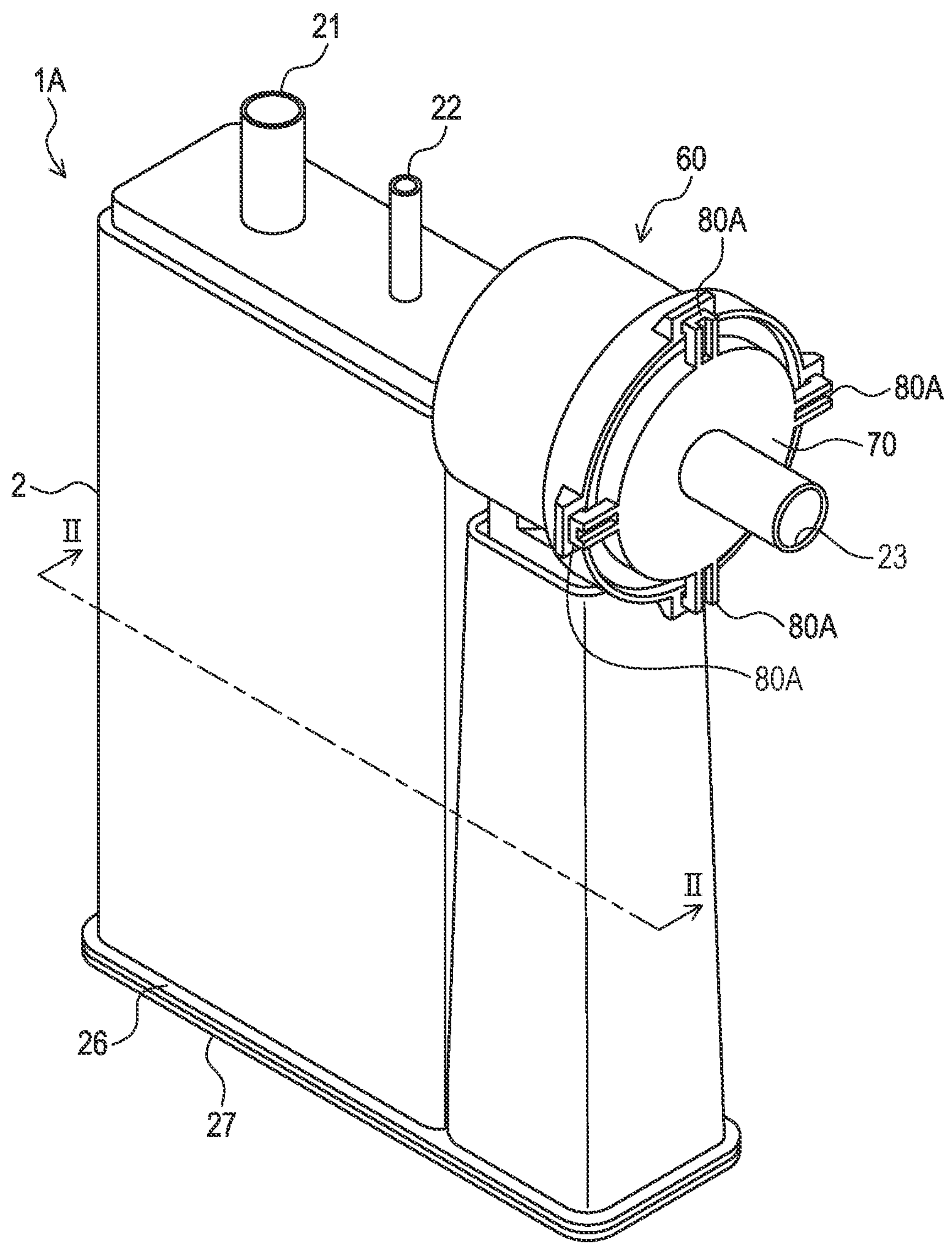
FIG. 1 is a perspective view illustrating an evaporated fuel treatment device according to an embodiment.
Figure 2:
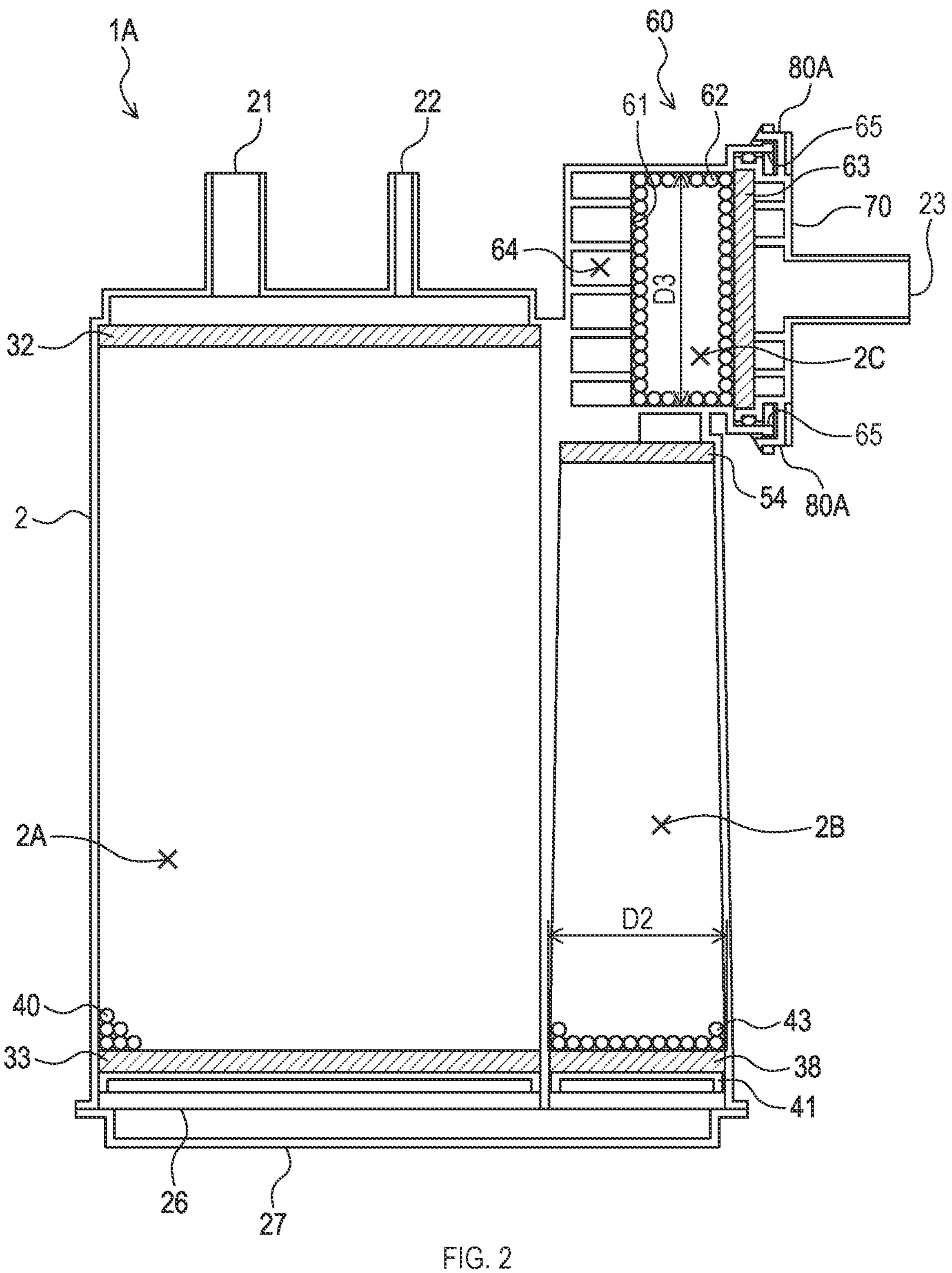
FIG. 2 is a cross-section view of the evaporated fuel treatment device along a line II-II in FIG. 1.
Figure 3:
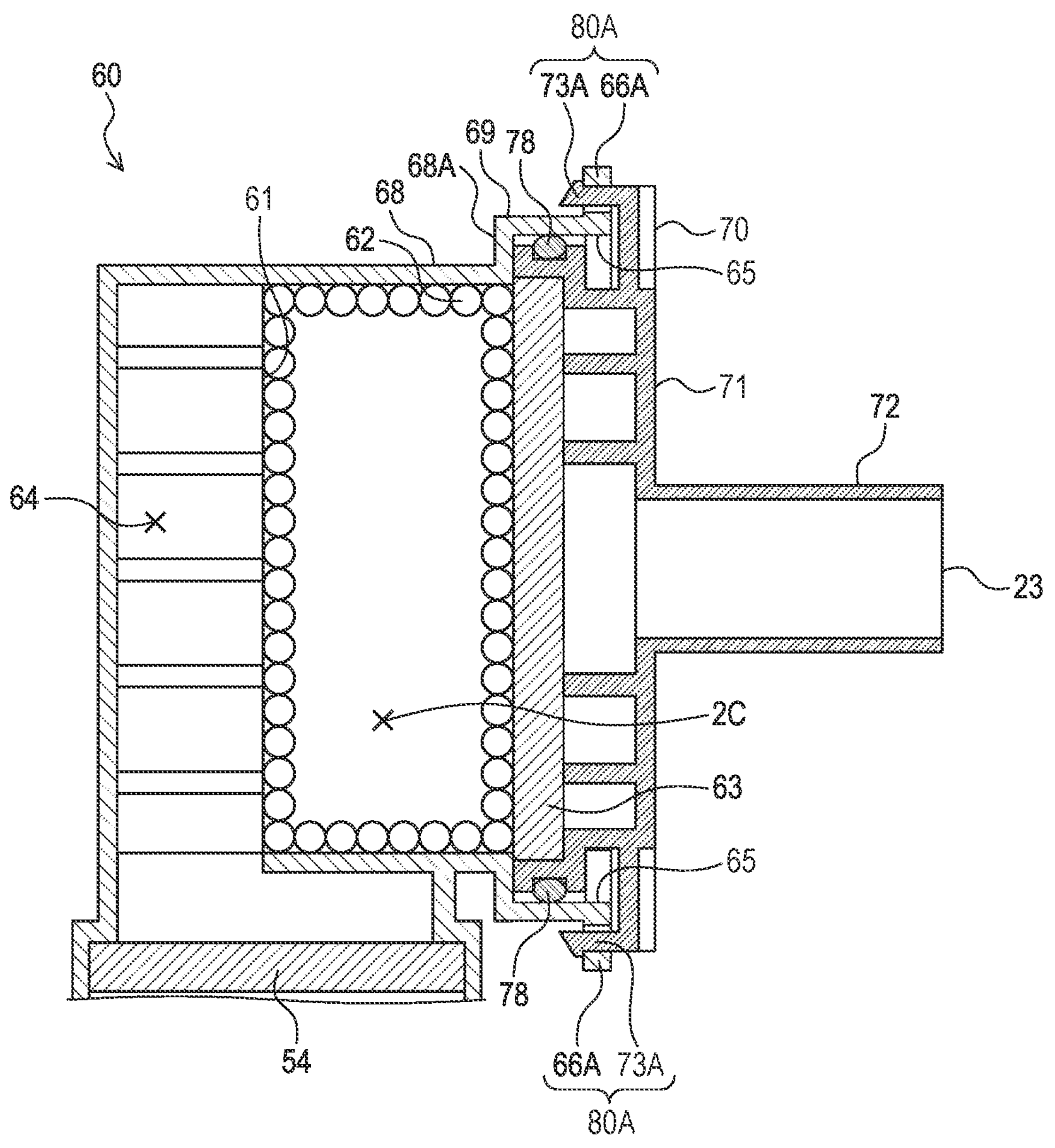
FIG. 3 is an enlarged cross-section view of a vicinity of an auxiliary chamber.

As illustrated in FIGS. 1 through 3, there is provided an evaporated fuel treatment device 1A comprising a function as a known canister. Specifically, the evaporated fuel treatment device 1A comprises a function to adsorb and desorb an evaporated fuel originating in a fuel tank (illustration omitted) of a vehicle. The evaporated fuel treatment device 1A comprises a main body case 2 and a lid 70.

The main body case 2 is a case including an inner space. The main body case 2 is, for example, a case made of synthetic resin. Materials of the main body case 2 are not limited to synthetic resin.

The main body case 2 comprises a charge port 21, a purge port 22, an atmosphere port 23, and an auxiliary chamber 60. The ports 21 through 23 are arranged on the same side in the main body case 2 (for example, an upper side in FIG. 1). However, a port direction of the atmosphere port 23 is different from port directions of the charge port 21 and the purge port 22. Here, the port directions mean directions to guide a gas to be discharged from these ports. The atmosphere port 23 is configured to guide the gas in the direction different from a direction in the charge port 21 and the purge port 22: and the charge port 21 and the purge port 22 are configured to guide the gas in the same direction.

The gas described herein means a gas flowing inside the evaporated fuel treatment device 1A, and may contain the atmospheric air and the evaporated fuel.

Hereinafter, the side in the main body case 2 where the charge port 21, the purge port 22, and the atmosphere port 23 are provided is referred to as "port side". The main body case 2 includes an opening 26 on a side opposite to the port side. The opening 26 is closed by a cap 27 functioning as a lid.

The charge port 21 is coupled to the fuel tank of the vehicle via a pipe. The charge port 21 is configured to draw the evaporated fuel originating in the fuel tank into the evaporated fuel treatment device 1A.

The purge port 22 is coupled to an intake pipe (illustration omitted) of an engine (illustration omitted) of the vehicle via a purge valve. The purge port 22 is configured to discharge the evaporated fuel inside the evaporated fuel treatment device 1A so as to supply the same to the engine.

The atmosphere port 23 is provided to the lid 70. The atmosphere port 23 is open to the atmosphere. The atmosphere port 23 is configured to discharge a gas removed of the evaporated fuel to the atmosphere. The atmosphere port 23 is configured to draw an external gas (that is, a purge gas), to thereby desorb (that is, purge) the evaporated fuel adsorbed by the evaporated fuel treatment device 1A.

As illustrated in FIG. 2, the inner space of the main body case 2 is divided into a first chamber 2A, a second chamber 2B, and a third chamber 2C.

In one example, the first chamber 2A has a substantially rectangular parallelepiped shape, or a circular cylindrical shape. The first chamber 2A is coupled to the charge port 21 and the purge port 22 at an end thereof on the port side (hereinafter, referred to as "port side-end"). Furthermore, there is arranged a first filter 32 at the port side-end of the first chamber 2A. There is arranged a second filter 33 at an end of the first chamber 2A in the vicinity of the cap 27 (hereinafter, referred to as "cap side-end"). Between the first filter 32 and the second filter 33, there is arranged an adsorbent 40. In one example, the adsorbent 40 is an aggregate of two or more pellets. The pellets are granular activated carbon. The pellets are produced by kneading powdery activated carbon with a binder and then forming a resulting activated carbon into a specific shape. Alternatively, there may be arranged, for example, an adsorbent such as powdery activated carbon in the first chamber 2A other than the pellets.

The first chamber 2A is coupled to the second chamber 2B via the cap side-end thereof. The gas, such as the gas containing the evaporated fuel, can travel back and forth inside the main body case 2 between the first chamber 2A and the second chamber 2B.

The second chamber 2B is a space having an elongated shape that extends toward the atmosphere port 23 from an end of the second chamber 2B in the vicinity of the cap 27 (hereinafter, referred to as "cap side-end"). In one example, the second chamber 2B has a substantially rectangular parallelepiped shape or a circular cylindrical shape. The second chamber 2B is coupled to the third chamber 2C at an end thereof on the port side (hereinafter, referred to as "port side-end"). Furthermore, the cap side-end of the second chamber 2B is provided with a first filter 38; and the port side-end of the second chamber 2B is provided with a second filter 54. In the second chamber 2B, there is arranged an adsorbent 43 in a space between the first filter 38 and the second filter 54. It should be noted that the adsorbent 43 may be of the same type as or a different type from the adsorbent 40.

The auxiliary chamber 60 includes a third chamber 2C. The third chamber 2C is a space in the vicinity of the second filter 54 of the second chamber 2B.

As illustrated in FIG. 3, the auxiliary chamber 60 comprises a contact portion 61, an adsorber 62, a filter 63, an opening 65, a first engagement portion 66A, a retaining portion 68, a stepped portion 68A, and a large-diameter portion 69. The adsorber 62 is inserted into the third chamber 2C through the opening 65.

The third chamber 2C in the auxiliary chamber 60 is formed to have a smaller volume (specifically, a volume of an inner space and an external volume) as compared to a volume of the second chamber 2B in the vicinity thereof. In other words, when the second chamber 2B is defined as a main chamber having a relatively greater volume, the third chamber 2C is defined as an auxiliary chamber having a relatively smaller volume.

The contact portion 61 is a portion configured to contact the adsorber 62 when the adsorber 62 is inserted into the third chamber 2C through the opening 65. The contact portion 61 is configured to contact the adsorber 62 to thereby retain the adsorber 62. The contact portion 61 is used so as to position the adsorber 62 such that a switching space 64 is formed rearward of the adsorber 62 in an insertion direction of the adsorber 62 (leftward in FIG. 3). The switching space 64 will be described later.

Examples of the adsorber 62 may include an activated carbon unit. Examples of the activated carbon unit may include: granular activated carbon: activated carbon formed into a honeycomb activated carbon, an activated carbon monolith, or the like; and activated carbon formed into a sheet, a cuboid shape, a columnar shape, a polygonal prism shape, or the like using a fibrous activated carbon. The adsorber 62 may be in the form different from the aforementioned form as long as the adsorber 62 is unitized.

In the first chamber 2A and the second chamber 2B, the gas mainly flows in a direction (hereinafter, simply referred to as "flow direction") from the first filters 32 and 38 toward the second filters 33 and 54, or an opposite flow direction thereto (that is, an up-down direction in FIG. 2). In contrast, the third chamber 2C is provided with the switching space 64 configured to switch the flow directions and in the switching space 64, the flow directions of the gas are switched to a direction toward the lid 70 or an opposite direction thereto. Specifically, the flow direction in the third chamber 2C is the direction from the switching space 64 toward the lid 70, or an opposite direction thereto. In other words, the flow direction in the third chamber 2C intersects the flow direction in the first chamber 2A and the second chamber 2B. More specifically, the flow direction in the third chamber 2C is a left-right direction orthogonal to the up-down direction in FIG. 2.

As illustrated in FIG. 2, the space where the adsorbent 43 is disposed in the second chamber 2B has a cross-sectional area referred to as "D2": and the adsorber 62 disposed in the third chamber 2C has a cross-sectional area referred to as "D3". It should be noted that the cross-sectional area D2 is a sectional area with respect to a gas flow in the second chamber 2B: and the cross-sectional area D3 is a sectional area with respect to a gas flow in the third chamber 2C. In the present embodiment, the cross-sectional area D3 of the adsorber 62 is greater than the cross-sectional area D2 of the space where the adsorbent 43 is disposed in the second chamber 2B.

The filter 63 is arranged closer to the lid 70 with respect to the adsorber 62 (rightward of the adsorber 62 in FIG. 3). The adsorber 62 is formed such that a surface thereof facing the filter 63 is flush with a surface of the stepped portion 68A facing the lid 70. In other words, along the insertion direction, the adsorber 62 has a height corresponding to a height of the auxiliary chamber 60 from the contact portion 61 to the stepped portion 68A.

The filter 63 is configured to receive a pressing force from the lid 70 upon the lid 70 being attached to the auxiliary chamber 60. Thus, the adsorber 62 is configured to be substantially immovably retained due to the pressing force from the filter 63 and a reaction force from the contact portion 61.

The retaining portion 68 is a portion retaining an outer peripheral part of the adsorber 62 with respect to the insertion direction (for example, top and bottom of the adsorber 62 in FIG. 3). The outer peripheral part with respect to the insertion direction is, in other words, an outer peripheral part of the adsorber 62 parallel to the flow direction of the gas. The retaining portion 68 has an inner surface formed into a circular cylindrical shape corresponding to a shape of the outer peripheral part of the adsorber 62. In these configurations, the outer peripheral part of the adsorber 62 with respect to the insertion direction is configured to contact the retaining portion 68 of the main body case 2.

The large-diameter portion 69 is arranged so as to surround the lid 70 at a position away from the adsorber 62 in an opposite direction with respect to the retaining portion 68 (that is, at a position radially outward of the retaining portion 68). In other words, the large-diameter portion 69 has an outer diameter larger than an outer diameter of the retaining portion 68.

The stepped portion 68A forms a step coupling the retaining portion 68 and the large-diameter portion 69. The stepped portion 68A forms a surface perpendicular to the retaining portion 68 and the large-diameter portion 69. The stepped portion 68A includes an inner surface (a right-side surface in FIG. 3), which is a joining surface between the main body case 2 and the lid 70.

The opening 65 is a portion allowing the third chamber 2C to communicate with the atmosphere. The opening 65 is an end of the large-diameter portion 69 opposite to the stepped portion 68A.

The lid 70 closes at least a part of the opening 65. As illustrated in FIG. 3, the lid 70 comprises a second engagement portion 73A and a main body 71 having a disk-shape and a pipe 72 coupled to the main body 71. The pipe 72 includes an open end forming the atmosphere port 23. There is arranged a sealing member 78 between an outer circumference of the lid 70 and the large-diameter portion 69. The sealing member 78 is configured to close a space between the opening 65 and the lid 70 over an entire circumference of the space. The sealing member 78 is a member having an annular shape. The annular shape includes a circular shape, an oval shape, a polygonal shape. That is, the annular shape means a shape surrounding an entire circumference of a hole.

The sealing member 78 may be, for example, an O-ring. The sealing member 78 closely seals the space around the outer circumference of the lid 70 with respect to the opening 65. With respect to the atmosphere port 23, however, the opening 65 remains open without being closed since the lid 70 is provided with the atmosphere port 23 communicating with the atmosphere.

It should be noted that the atmosphere port 23 may be coupled to any module such as an evaporative leak check module (also referred to as "ELCM"). The ELCM is a module configured to perform a leak inspection on the evaporated fuel treatment device 1A.

The lid 70 is configured to be fixed to the main body case 2 with a snap-fit structure 80A. The snap-fit structure 80A is a structure that employs a method of fitting a protrusion into a recess by taking advantage of elasticity of a material, to thereby fix the protrusion and the recess. In the present embodiment, the first engagement portion 66A and the second engagement portion 73A are configured to be engaged, whereby the lid 70 is attached to the main body case 2. The first engagement portion 66A is a recess provided in an outer circumference of the large-diameter portion 69 in the main body case 2. The second engagement portion 73A is a protrusion provided to the outer circumference of the lid 70.

In the foregoing configuration, when the lid 70 is inserted along the large-diameter portion 69, the second engagement portion 73A of the lid 70 is bent toward an inner circumference of the lid 70. Upon the second engagement portion 73A being fitted into the first engagement portion 66A of the main body case 2, the second engagement portion 73A is released from being bent, whereby the first engagement portion 66A and the second engagement portion 73A remain engaged. In other words, the lid 70 is fixed to the main body case 2. In the present embodiment, four of the same snap-fit structures 80A are used so as to fix the lid 70 and the main body case 2.

In the evaporated fuel treatment device 1A, the lid 70 is configured to be attached to the main body case 2 while pressing the adsorber 62 via the filter 63. Thus, the lid 70 is configured to be arranged in the vicinity of the adsorber 62. In other words, the lid 70 is configured to be arranged on a path where the adsorber 62 moves toward the opening 65 (that is, arranged closer to the opening 65 with respect to the adsorber 62). It can be also said that the lid 70 comprises a function to apply a pressure to the adsorber 62 from the opening 65 to thereby suppress movement of the adsorber 62.

1-2. Effects

The embodiment described above in details exhibits effects to be described below.

(1a) The evaporated fuel treatment device 1A comprises the main body case 2 and the lid 70. The main body case 2 comprises adsorption chambers 2A through 2C, the adsorber 62, and the opening 65. Each of the adsorption chambers 2A through 2C accommodates adsorbents therein. The adsorber 62 is an aggregate of the adsorbents to be arranged at least in the third chamber 2C, among the adsorption chambers 2A through 2C, communicating with the atmosphere. The opening 65 allows the third chamber 2C to communicate with the atmosphere. The lid 70 is configured to close at least a part of the opening 65 and fixed to the main body case 2 with the snap-fit structure 80A. The lid 70 is configured to be arranged in the vicinity of the adsorber 62.

In the configuration above, the snap-fit structure 80A is used so as to fix the lid 70 and the main body case 2. Consequently, even when fixing the lid 70 and the main body case 2 causes vibrations, the vibrations are not easily transferred to the adsorber 62 as compared to a case where vibration welding is utilized. Accordingly, the configuration of adjacently arranging the lid 70 and the adsorber 62 can suppress a damage of the adsorber 62.

(1b) In the present embodiment, the outer peripheral part of the adsorber 62 is configured to contact the main body case 2.

Such a configuration allows a wider cross-sectional area with respect to a flow path since the contacts the main body case 2.

(1c) In the present embodiment, the main body case 2 comprises the retaining portion 68, the large-diameter portion 69, and the stepped portion 68A. The retaining portion 68 retains the adsorber 62. The large-diameter portion 69 is configured to be arranged so as to surround the lid 70 at the position away from the retaining portion 68 and radially outward of the adsorber 62. The large-diameter portion 69 is configured to be coupled to the lid 70 with the snap-fit structure 80A. The stepped portion 68A forms the step coupling the retaining portion 68 and the large-diameter portion 69.

In the configuration above, even in a case where impact occurs when the main body case 2 and the lid 70 are coupled with the snap-fit structure 80A, the impact can be absorbed by the stepped portion 68A. Therefore, the configuration above can inhibit the impact from being transferred to the retaining portion 68 and the adsorber 62.

(1d) In the present embodiment, there is also provided the sealing member 78 configured to seal the space between the opening 65 and the lid 70 over the entire circumference of the space.

Such a configuration easily allows airtightness at the opening 65 without performing welding or the like since the sealing member 78 closes the space between the opening 65 and the lid 70 over the entire circumference of the space.

(1e) In the present embodiment, the third chamber 2C is formed to have a smaller volume relative to the second chamber 2B, which is an adsorption chamber, among the adsorption chambers 2A through 2C, communicating with the third chamber 2C. The cross-sectional area of the adsorber 62 with respect to the gas flow in the third chamber 2C is greater than the cross-sectional area of the space where the adsorbent 43 is arranged with respect to the gas glow in the second chamber 2B.

The above configuration can further suppress leakage of the evaporated fuel since the cross-sectional area of the adsorber 62 is set to be greater in the third chamber 2C located in the vicinity of the opening 65.

2. Other Embodiments

Although the embodiment of the present disclosure has been described hereinabove, the present disclosure is not limited to the above-described embodiment and can be variously modified.

Figure 4A:
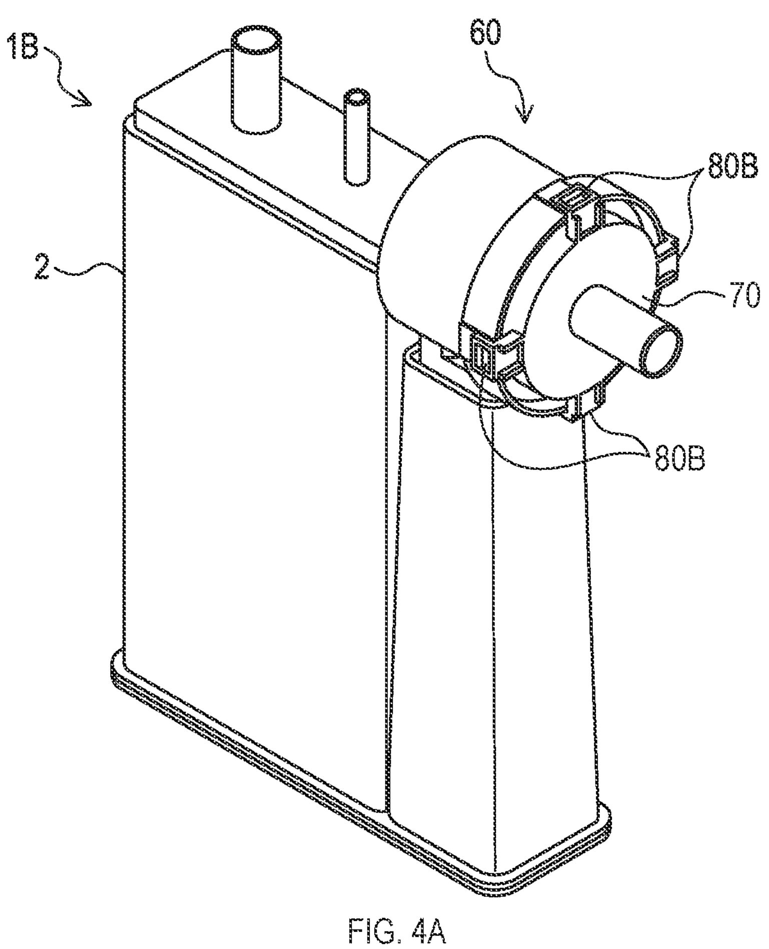
FIG. 4A is a perspective view illustrating an evaporated fuel treatment device according to a first modified example.
Figure 4B:
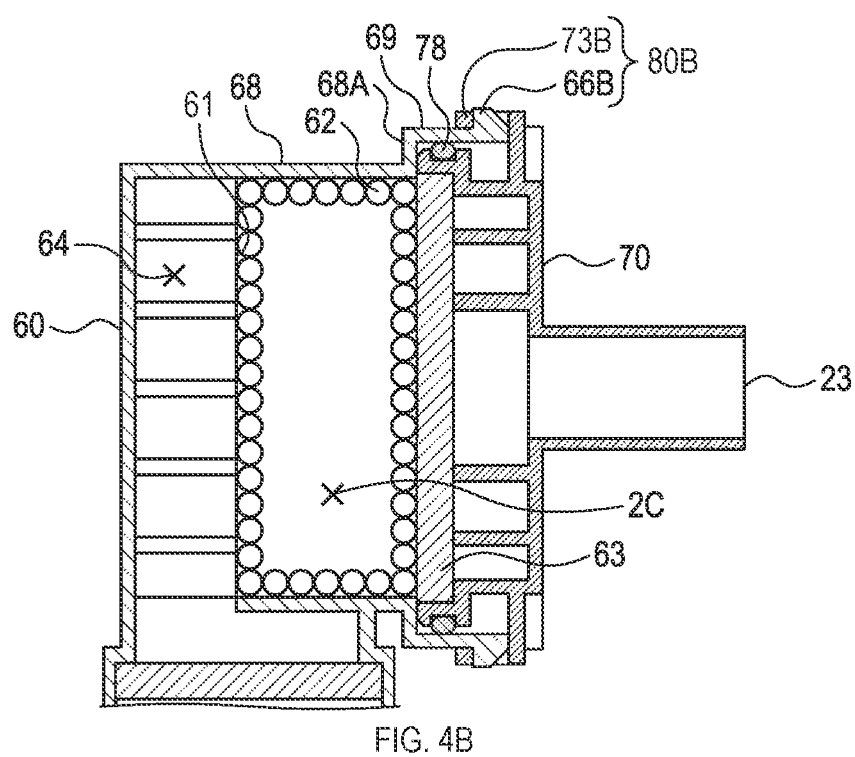
FIG. 4B is an enlarged cross-section view of a vicinity of an auxiliary chamber according to the first modified example.

(2a) The snap-fit structure 80A utilized in the above-described embodiment may be any snap-fit structure. For example, a snap-fit structure 80B may be utilized as in an evaporated fuel treatment device 1B according to a first modified example illustrated in FIGS. 4A and 4B.

The snap-fit structure 80A in the above-described embodiment comprises the first engagement portion 66A as the recess in the main body case 2, and the second engagement portion 73A as the protrusion in the lid 70. In contrast, the snap-fit structure 80B in the first modified example comprises a first engagement portion 66B as a protrusion in the main body case 2, and a second engagement portion 73B as a recess in the lid 70.

In the above configuration, the first engagement portion 66B in the main body case 2 is configured to be bent and engaged with the second engagement portion 73B in the lid 70. Since the main body case 2 is provided with the stepped portion 68A, the first engagement portion 66B is easily bent as compared to a case where the stepped portion 68A is not provided. Furthermore, the stepped portion 68A can absorb bending and vibrations. Thus, when the lid 70 is attached to the main body case 2, the stepped portion 68A can suppress transfer of a resulting pressing force and resulting vibrations to the adsorber 62.

Figure 5A:
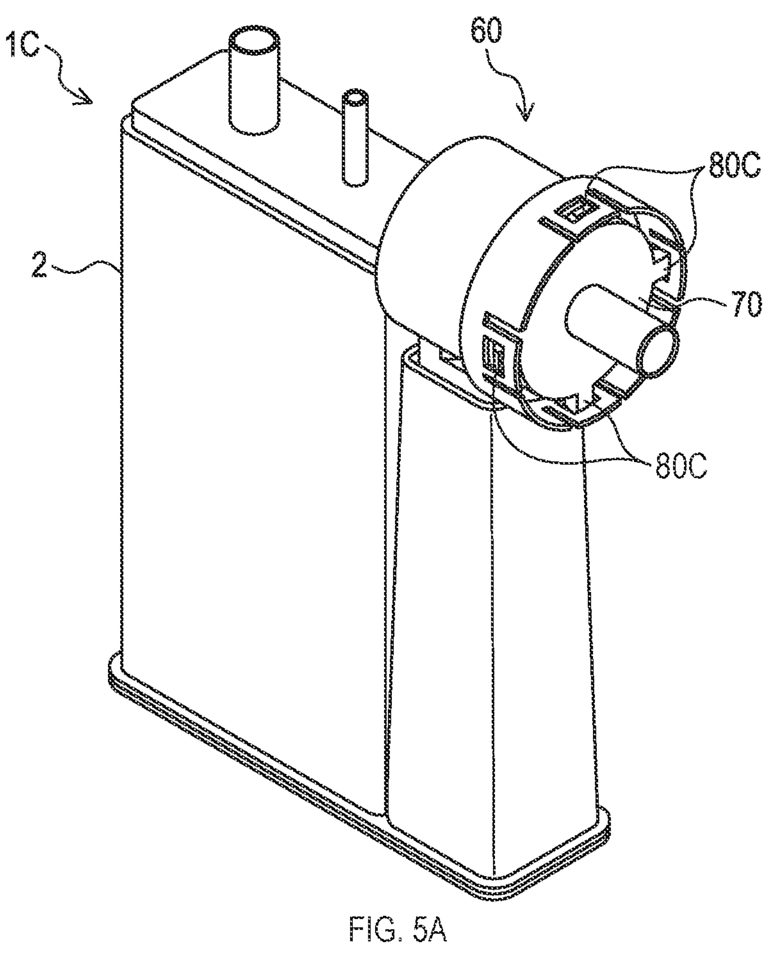
FIG. 5A is a perspective view illustrating an evaporated fuel treatment device according to a second modified example.
Figure 5B:
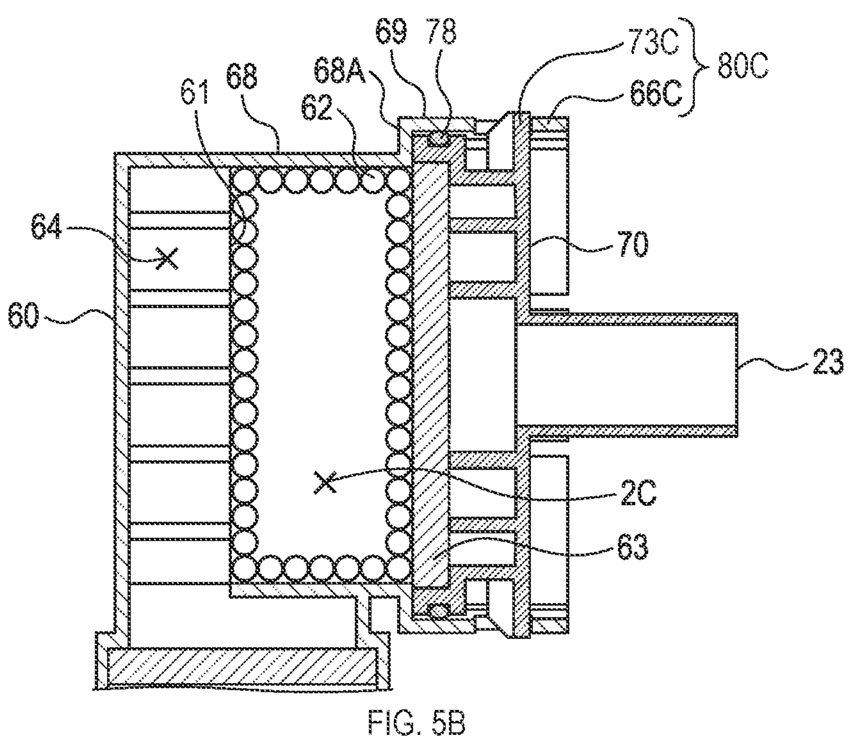
FIG. 5B is an enlarged cross-section view of a vicinity of an auxiliary chamber according to the second modified example.

(2b) Furthermore, the snap-fit structure may be, for example, a snap-fit structure 80C as in an evaporated fuel treatment device 1C according to a second modified example illustrated in FIGS. 5A and 5B. As in the above-described snap-fit structure 80A, the snap-fit structure 80C in the second modified example comprises a first engagement portion 66C as a recess in the main body case 2, and a second engagement portion 73C as a protrusion in the lid 70. While the snap-fit structure 80A in the above-described embodiment is formed such that a portion protruding radially from the large-diameter portion 69 is the first engagement portion 66A, the snap-fit structure 80C in the second modified example is formed such that a hole provided in the outer circumference of the large-diameter portion 69 is the first engagement portion 66C.

Such a configuration can achieve the snap-fit structure 80C without providing the large-diameter portion 69 with the protruding part.

Figure 6A:
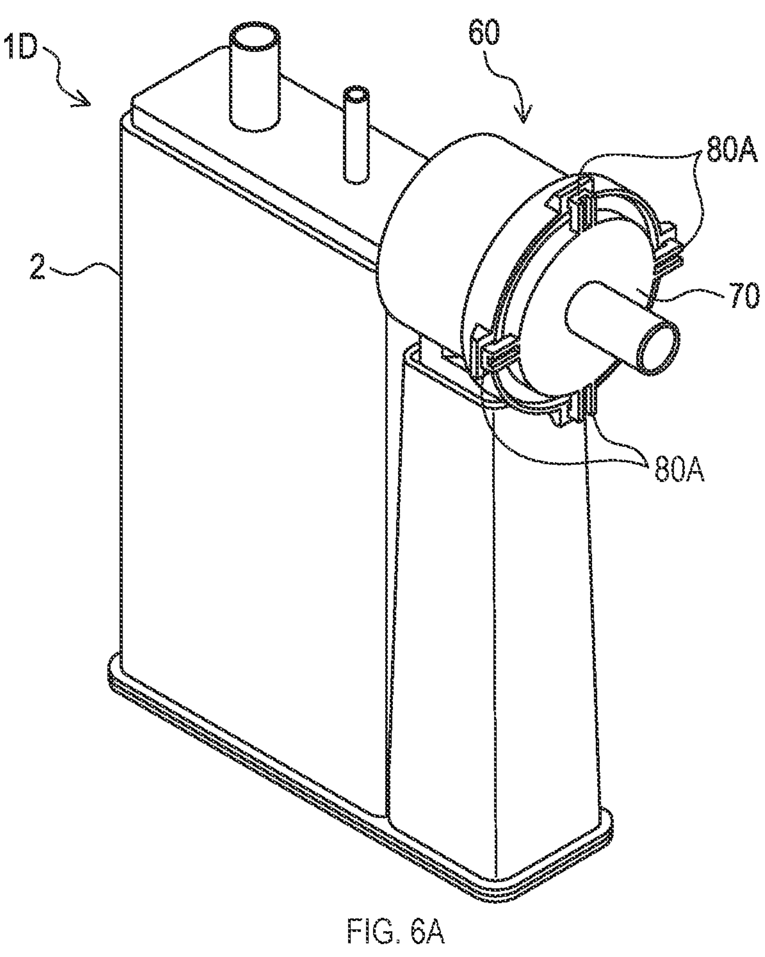
FIG. 6A is a perspective view illustrating an evaporated fuel treatment device according to a third modified example.
Figure 6B:
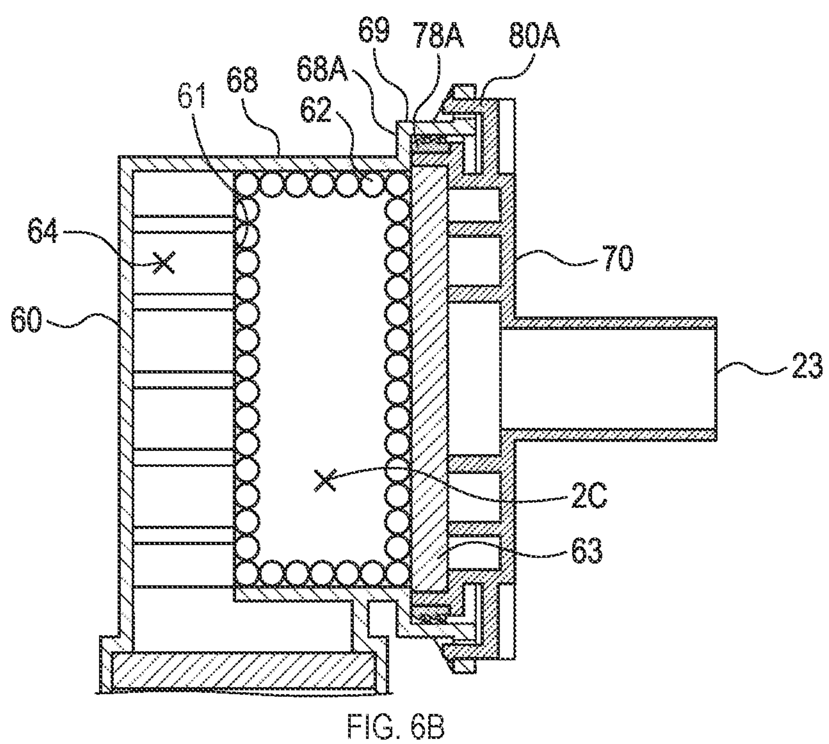
FIG. 6B is an enlarged cross-section view of a vicinity of an auxiliary chamber according to the third modified example.

(2c) Although the above-described embodiment utilizes the O-ring as the sealing member 78, the sealing member 78 is not limited to this configuration. For example, as in an evaporated fuel treatment device ID according to a third modified example illustrated in FIGS. 6A and 6B, the sealing member 78A may be in the form of a finned ring in place of the O-ring. The finned ring comprises a ring-shaped member and two or more fins extending in a protruding manner from an outer perimeter of the ring-shaped member. The ring-shaped member and the two or more fins are integrally formed.

Figure 7A:
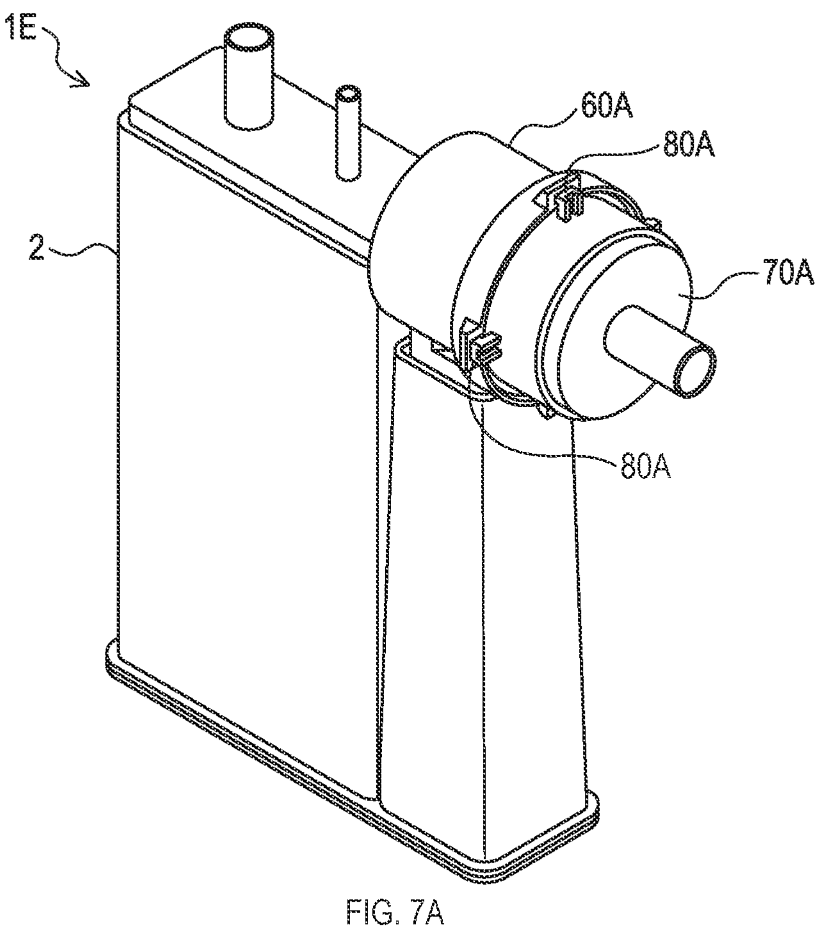
FIG. 7A is a perspective view illustrating an evaporated fuel treatment device according to a fourth modified example.
Figure 7B:
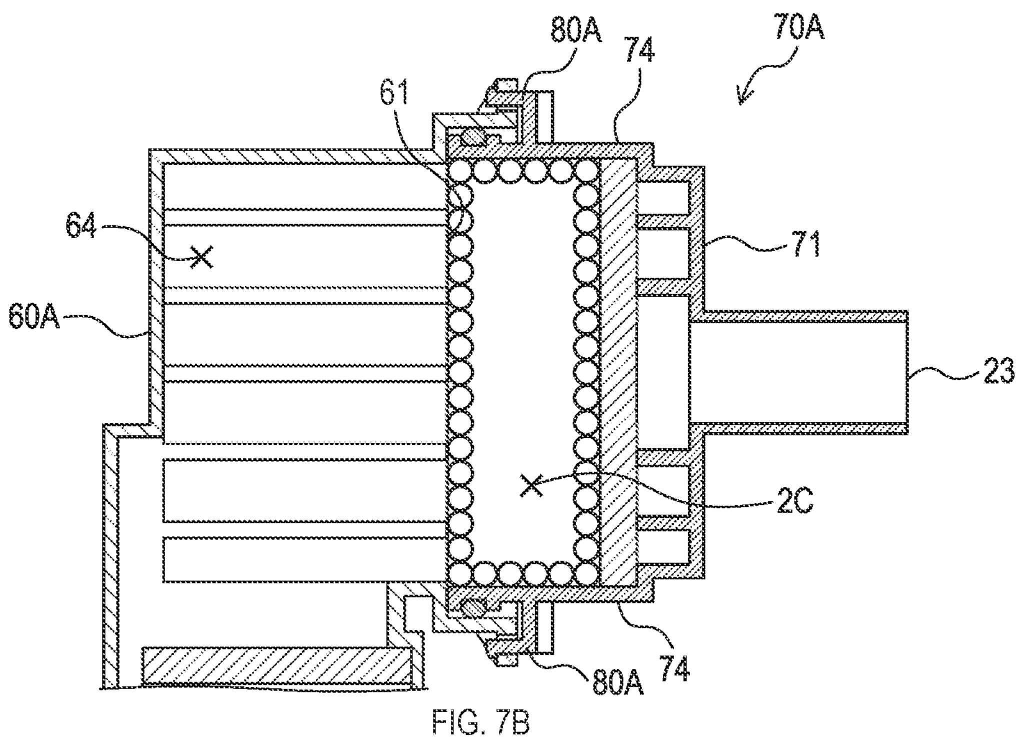
FIG. 7B is an enlarged cross-section view of a vicinity of an auxiliary chamber according to the fourth modified example.

(2d) The lid 70 in the above-described embodiment is configured to be attached to the main body case 2 in a state where the adsorber 62 is inserted into the main body case 2. However, the lid 70 is not limited to this configuration. For example, as in an evaporated fuel treatment device 1E according to a fourth modified example illustrated in FIGS. 7A and 7B, there may be provided a lid 70A in place of the lid 70, and the adsorber 62 may be disposed inside the lid 70A.

In the above configuration, the lid 70A can be attached to the main body case 2 in a state where the adsorber 62 is inserted into the lid 70A, that is, the adsorber 62 and the lid 70A are arranged in the vicinity of each other and more specifically, the adsorber 62 and the lid 70A contact each other. Such a configuration enables the adsorber 62 and the lid 70A to remain arranged in the vicinity of each other prior to the lid 70A being attached to the main body case 2.

Figure 8A:
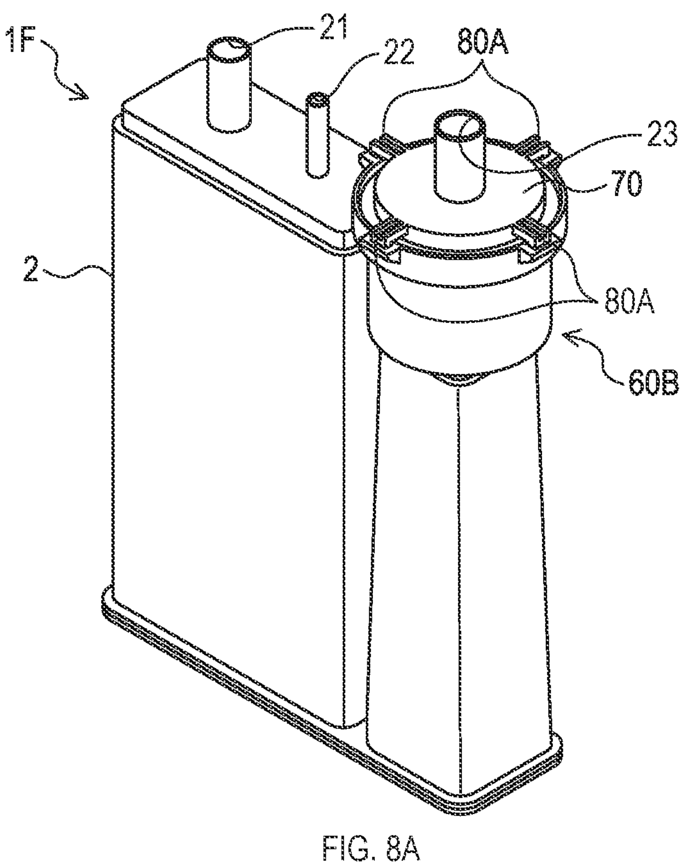
FIG. 8A is a perspective view illustrating an evaporated fuel treatment device according to a fifth modified example.

(2e) The atmosphere port 23 in the above-described embodiment is formed so as to be oriented in the different direction from and particularly, in a direction away from the charge port 21 and the purge port 22. However, the atmosphere port 23 is not limited to this configuration. For example, as in an evaporated fuel treatment device 1E according to a fifth modified example illustrated in FIG. 8A, the atmosphere port 23 may be oriented in the same direction as the charge port 21 and the purge port 22.

Figure 8B:
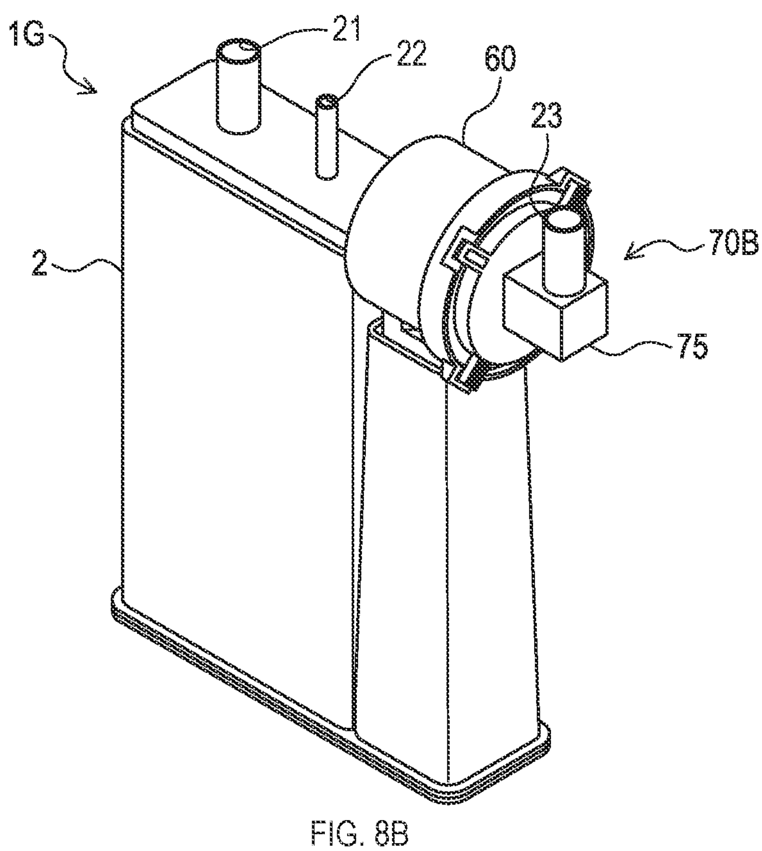
FIG. 8B is a perspective view illustrating an evaporated fuel treatment device according to a sixth modified example.

(2f) Furthermore, the lid 70 may be replaced with a lid 70B as in an evaporated fuel treatment device IF according to a sixth modified example illustrated in FIG. 8B. In the lid 70B, the atmosphere port 23 is configured to communicate with the main body case 2 via a direction switcher 75. The direction switcher 75 has a substantially rectangular parallelepiped shape, and includes a space so as to carry the gas therein. The direction switcher 75 having the substantially rectangular parallelepiped shape includes a facing surface that faces a main body 71 (that is, a substantially circular part) of the lid 70B. One side surface of four side surfaces of the direction switcher 75 in contact with the facing surface is provided with, at any position thereof, a pipe 72 such that the atmosphere port 23 is oriented in a direction orthogonal to the one side surface. It is sufficient that the one side surface of the direction switcher 75 to which the atmosphere port 23 is provided and an orientation of the atmosphere port 23 intersect each other. That is, the one side surface of the direction switcher 75 and the orientation of the atmosphere 23 may not necessarily be orthogonal to each other. Furthermore, the direction switcher 75 is formed such that the main body 71 of the lid 70B and the pipe 72 are coupled with airtightness being allowed therebetween.

Figure 9A:
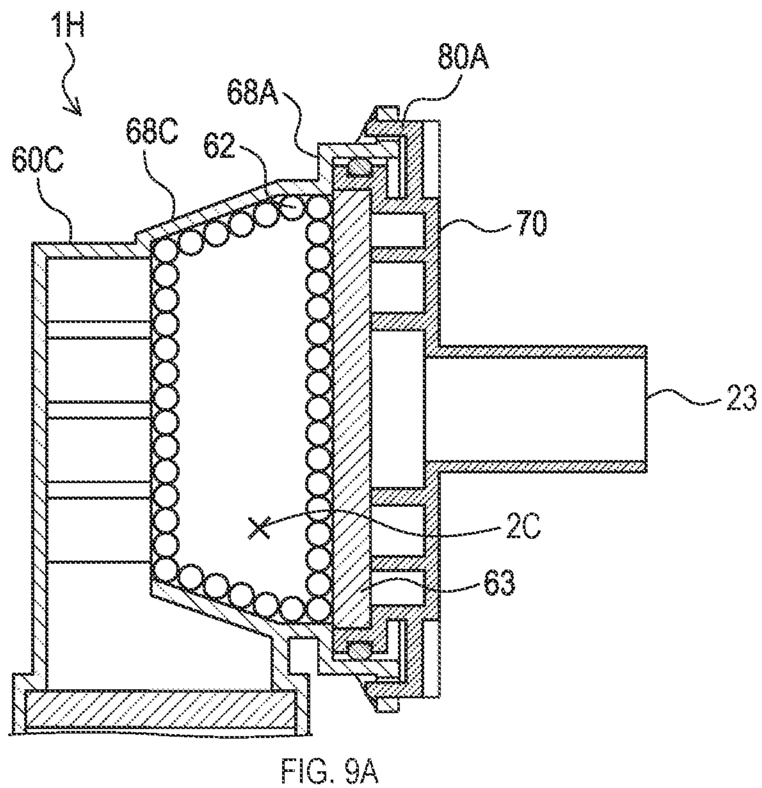
FIG. 9A is an enlarged cross-section view of a vicinity of an auxiliary chamber according to a seventh modified example.

(2g) In the above-described embodiment, the auxiliary chamber 60 includes a substantially circular cylindrical inner space, and comprises the adsorber 62 having a substantially circular cylindrical shape so as to correspond to the shape of the inner space. However, the auxiliary chamber 60 is not limited to this configuration. For example, the auxiliary chamber 60 may be replaced with an auxiliary chamber 60C as in an evaporated fuel treatment device 1H according to a seventh modified example illustrated in FIG. 9A. The auxiliary chamber 60C comprises a retaining portion 68C forming a part of a conical outer periphery of the auxiliary chamber 60C. The retaining portion 68C is formed into a tapered shape such that an inner diameter thereof is reduced in a direction away from the lid 70. The adsorber 62 is formed in substantially the same shape as the shape of the tapered part of the retaining portion 68C. In other words, the adsorber 62 is formed into a truncated cone shape.

Figure 9B:
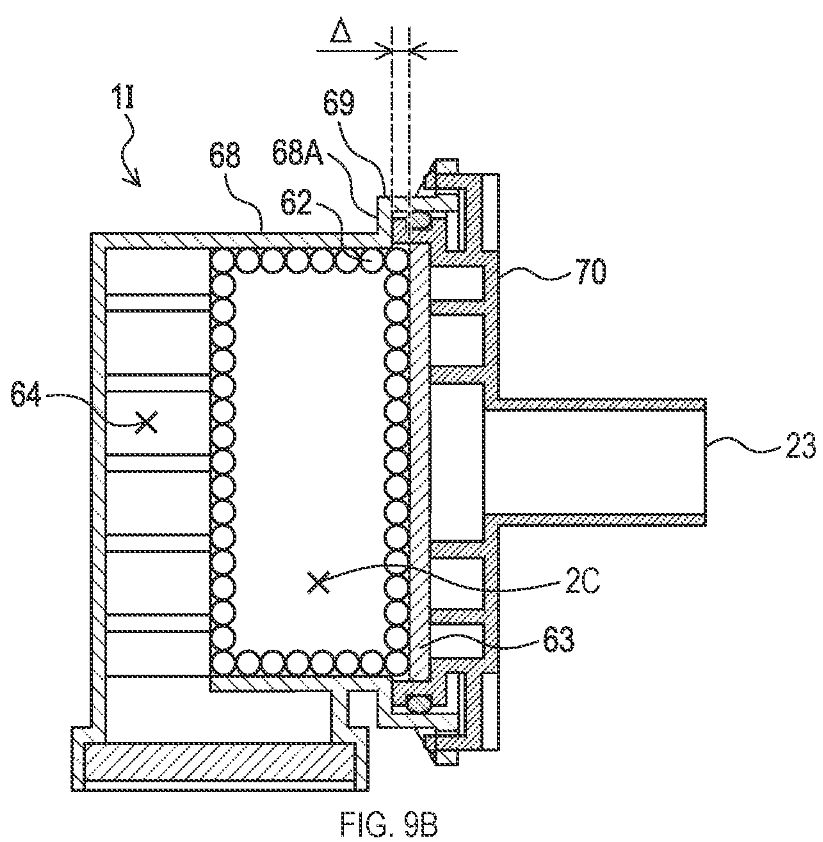
FIG. 9B is an enlarged-section view of a vicinity of an auxiliary chamber according to an eighth modified example.

(2h) In the above-described embodiment, the adsorber 62 is formed such that the surface thereof facing the filter 63 is flush with the surface of the stepped portion 68A facing the lid 70. However, the configuration of the adsorber 62 is not limited hereto. For example, the adsorber 62 may be formed such that the surface thereof facing the filter 63 protrudes from the surface of the stepped portion 68A facing the lid 70 by a length Δ as in an evaporated fuel treatment device 1I according to an eighth modified example illustrated in FIG. 9B.

Such a configuration makes it easier for the lid 70 to press the adsorber 62 since the surface of the adsorber 62 facing the filter 63 protrudes.

(2i) Two or more functions performed by one element in the aforementioned embodiment may be achieved by two or more elements. One function performed by one element may be achieved by two or more elements. Two or more functions performed by two or more elements may be achieved by one element. One function performed by two or more elements may be achieved by one element. Furthermore, a part of a configuration in the aforementioned embodiments may be omitted. Still further, at least a part of the configuration in the aforementioned embodiments may be added to or replaced with another part of the configuration in the aforementioned embodiments. It should be noted that any and all modes included in the technical ideas that are identified by the languages recited in the claims are embodiments of the present disclosure.

(2j) In addition to the evaporated fuel treatment device 1A described above, the present disclosure can be achieved in various modes such as a system comprising the evaporated fuel treatment device 1A and a method of treating an evaporated fuel.

Technical Ideas Disclosed in Present Disclosure

[Item 1]

An evaporated fuel treatment device comprising:
a main body case; and
a lid,
the main body case including:
two or more adsorption chambers, each adsorption chamber of the two or more adsorption chambers accommodating adsorbents therein, the two more adsorption chambers including an atmosphere-side adsorption chamber communicating with the atmosphere;
an adsorber arranged at least in the atmosphere-side adsorption chamber, the adsorber being an aggregate of the adsorbents; and
an opening allowing the atmosphere-side adsorption chamber to communicate with the atmosphere,
the lid being configured to (i) close at least a part of the opening and (ii) be fixed to the main body case with a snap-fit structure, and the lid being configured to be arranged in the vicinity of the adsorber.

[Item 2]

The evaporated fuel treatment device according to Item 1, wherein the adsorber is configured such that an outer peripheral part thereof contacts the main body case.

[Item 3]

The evaporated fuel treatment device according to Item 1 or 2, wherein the main body case further includes:

a retaining portion retaining the adsorber;

a large-diameter portion configured to (i) be arranged so as to surround the lid at a position away from and radially outward of the retaining portion and (ii) be coupled to the lid with the snap-fit structure; and a stepped portion forming a step coupling the retaining portion and the large-diameter portion.

[Item 4]

The evaporated fuel treatment device according to any one of Items 1 through 3, wherein the evaporated fuel treatment device further comprises a sealing member configured to close a seal between the opening and the lid over an entire circumference of the space.

[Item 5]

The evaporated fuel treatment device according to any one of Items 1 through 4, wherein the atmosphere-side adsorption chamber is an auxiliary chamber formed to have a smaller volume with respect to a main chamber, the main chamber being an adsorption chamber included in the two or more adsorption chambers and communicating with the atmosphere-side adsorption chamber, and wherein the adsorber is formed such that a cross-sectional area thereof with respect to a gas flow in the auxiliary chamber is greater than a cross-sectional area of the adsorber with respect to a gas flow in the main chamber.

What is claimed is:

1. An evaporated fuel treatment device comprising:

a main body case; and a lid, the main body case including:

two or more adsorption chambers, each adsorption chamber of the two or more adsorption chambers accommodating adsorbents therein, the two or more adsorption chambers including an atmosphere-side adsorption chamber communicating with the atmosphere;

an adsorber arranged at least in the atmosphere-side adsorption chamber, the adsorber being an aggregate of the adsorbents;

an opening allowing the atmosphere-side adsorption chamber to communicate with the atmosphere, a retaining portion retaining the adsorber;

a large-diameter portion configured to be arranged so as to surround the lid at a position away from and radially outward of the retaining portion and to be coupled to the lid with a snap-fit structure; and a stepped portion forming a step coupling the retaining portion and the large-diameter portion, the lid being configured to close at least a part of the opening and to be fixed to the main body case with the snap-fit structure, and the lid being configured to be arranged in the vicinity of the adsorber.

2. The evaporated fuel treatment device according to claim 1, wherein the adsorber is configured such that an outer periphery thereof contacts the main body case.

3. The evaporated fuel treatment device according to claim 1, wherein the evaporated fuel treatment device further comprises a sealing member configured to seal a space between the opening and the lid over an entire circumference of the space.

4. The evaporated fuel treatment device according to claim 1, wherein the atmosphere-side adsorption chamber is an auxiliary chamber formed to have a smaller volume with respect to a main chamber, the main chamber being an adsorption chamber included in the two or more adsorption chambers and communicating with the atmosphere-side adsorption chamber, and wherein the adsorber is formed such that a cross-sectional area thereof with respect to a gas flow in the auxiliary chamber is greater than a cross-sectional area of the adsorber with respect to a gas flow in the main chamber.

5. The evaporated fuel treatment device according to claim 1, wherein the stepped portion forms a joining surface between the main body case and the lid.

6. The evaporated fuel treatment device according to claim 1, wherein the adsorber is formed such that a surface of the adsorber facing the lid is flush with a surface of the stepped portion facing the lid.

7. The evaporated fuel treatment device according to claim 1, wherein the adsorber is formed such that a surface of the adsorber facing the lid protrudes beyond a surface of the stepped portion facing the lid.

* * * * *